US007861631B2

(12) United States Patent
Freshwater et al.

(10) Patent No.: US 7,861,631 B2
(45) Date of Patent: Jan. 4, 2011

(54) SYSTEM AND METHOD FOR CUTTING ROOFING SHINGLES

(75) Inventors: John G. Freshwater, Bakersfield, CA (US); Olan Leitch, Bakersfield, CA (US)

(73) Assignee: Elk Premium Building Products, Inc., Dallas, TX (US)

( * ) Notice: Subject to any disclaimer, the term of this patent is extended or adjusted under 35 U.S.C. 154(b) by 0 days.

(21) Appl. No.: 11/498,364

(22) Filed: Aug. 3, 2006

(65) Prior Publication Data

US 2007/0017330 A1 Jan. 25, 2007

Related U.S. Application Data

(63) Continuation-in-part of application No. 10/613,152, filed on Jul. 3, 2003, now abandoned.

(51) Int. Cl.
*B23D 25/04* (2006.01)

(52) U.S. Cl. ............................ 83/332; 83/333; 83/343; 83/346

(58) Field of Classification Search ..................... 83/37, 83/332, 333, 346, 920, 343, 42, 43, 44, 46, 83/47
See application file for complete search history.

(56) References Cited

U.S. PATENT DOCUMENTS

| | | | | |
|---|---|---|---|---|
| 219,617 | A * | 9/1879 | Cady | 83/333 |
| 463,916 | A * | 11/1891 | Peterson | 83/343 |
| 881,023 | A * | 3/1908 | Overbury | 242/525 |
| 909,957 | A * | 1/1909 | Staude | 83/116 |
| 1,244,654 | A * | 10/1917 | Spiegel | 83/302 |
| 1,274,623 | A * | 8/1918 | Spiegel | 83/333 |
| 1,345,099 | A * | 6/1920 | Overbury | 83/41 |
| 1,379,727 | A * | 5/1921 | Speer | 83/32 |
| 1,486,346 | A * | 3/1924 | Hoskins | 83/32 |
| 1,666,204 | A * | 4/1928 | Harshberger | 83/32 |
| 1,748,981 | A * | 3/1930 | Harris | 52/518 |
| 1,758,410 | A * | 5/1930 | Reichel | 225/96 |
| 1,841,296 | A * | 1/1932 | Overbury | 427/187 |
| 1,868,751 | A * | 7/1932 | Koch | 118/39 |
| 1,973,863 | A * | 9/1934 | Betjeman | 83/43 |
| 2,092,052 | A * | 9/1937 | Cumfer | 83/677 |
| 2,530,319 | A * | 11/1950 | Young | 83/430 |

(Continued)

FOREIGN PATENT DOCUMENTS

JP 07016601 A * 1/1995

OTHER PUBLICATIONS

Charles Goodman, Notice of Abandonment of U.S. Appl. No. 10/613,152, filed Aug. 25, 2006, United States Patent and Trademark Office, Alexandria, VA.

(Continued)

*Primary Examiner*—Jason Daniel Prone
*Assistant Examiner*—Jennifer Swinney
(74) *Attorney, Agent, or Firm*—Haynes and Boone, LLP

(57) ABSTRACT

A system and method for cutting shingles according to which a plurality of cutting blades are mounted on the outer circumference of a cutting cylinder, and the cylinder is rotated with the blades engaging the sheet while effecting relative translational movement between the cylinder and the sheet so that shingles are cut from the sheet upon one rotation of the cylinder.

1 Claim, 5 Drawing Sheets

U.S. PATENT DOCUMENTS

| | | | | | |
|---|---|---|---|---|---|
| 3,381,563 | A | * | 5/1968 | Bishop | 83/303 |
| 3,870,867 | A | * | 3/1975 | Hamisch, Sr. | 235/487 |
| 3,875,837 | A | * | 4/1975 | Dussaud | 83/46 |
| 3,921,358 | A | | 11/1975 | Bettoli | |
| 3,958,051 | A | * | 5/1976 | Smith | 428/42.3 |
| 3,964,356 | A | * | 6/1976 | Dineen | 83/302 |
| 4,072,076 | A | | 2/1978 | Miles | |
| 4,216,687 | A | | 8/1980 | Passafiume et al. | |
| 4,266,458 | A | * | 5/1981 | Rogers | 83/864 |
| 4,717,614 | A | | 1/1988 | Bondoc et al. | |
| D309,027 | S | | 7/1990 | Noone et al. | |
| 5,102,487 | A | | 4/1992 | Lamb | |
| D309,027 | S | | 12/1992 | Noone et al. | |
| 5,201,699 | A | * | 4/1993 | Protz, Jr. | 493/346 |
| 5,232,530 | A | | 8/1993 | Malmquist et al. | |
| 5,369,929 | A | | 12/1994 | Weaver et al. | |
| 5,611,186 | A | | 3/1997 | Weaver | |
| 5,641,551 | A | | 6/1997 | Simpson et al. | |
| 5,666,776 | A | | 9/1997 | Weaver et al. | |
| 5,875,699 | A | | 3/1999 | Koelsch | |
| 5,967,009 | A | * | 10/1999 | Truttmann et al. | 83/52 |
| 6,220,329 | B1 | * | 4/2001 | King et al. | 156/512 |
| 6,289,648 | B1 | | 9/2001 | Freshwater et al. | |
| 6,334,923 | B1 | | 1/2002 | Koschitzky | |
| 6,360,638 | B1 | | 3/2002 | White et al. | |
| 6,635,140 | B2 | | 10/2003 | Phillips et al. | |
| 6,729,216 | B2 | * | 5/2004 | Schaede | 83/151 |
| 6,968,944 | B2 | * | 11/2005 | Hitchings | 206/308.1 |
| 6,971,295 | B2 | * | 12/2005 | Teshima | 83/162 |
| 6,994,005 | B2 | * | 2/2006 | Lamothe | 83/156 |
| 7,028,598 | B2 | * | 4/2006 | Teshima | 83/879 |
| 2002/0088324 | A1 | | 7/2002 | White et al. | |
| 2003/0084768 | A1 | | 5/2003 | Adami | |
| 2005/0193673 | A1 | | 9/2005 | Rodrigues et al. | |

OTHER PUBLICATIONS

Charles Goodman, Non-Final Rejection of U.S. Appl. No. 10/613,152, filed Feb. 8, 2006, United States Patent and Trademark Office, Alexandria, VA.

Charles Goodman, Advisory Action of U.S. Appl. No. 10/613,152, filed Dec. 19, 2005, United States Patent and Trademark Office, Alexandria, VA.

Charles Goodman, Final Rejection of U.S. Appl. No. 10/613,152, filed Aug. 25, 2005, United States Patent and Trademark Office, Alexandria, VA.

Charles Goodman, Non-Final Rejection of U.S. Appl. No. 10/613,152, filed Apr. 7, 2005, United States Patent and Trademark Office, Alexandria, VA.

Charles Goodman, Restriction Requirement of U.S. Appl. No. 10/613,152, filed Dec. 17, 2004, United States Patent and Trademark Office, Alexandria, VA.

U.S. Appl. No. 10/613,512, filed Jul. 3, 2003, Freshwater et al.

Office Action mailed Jun. 23, 2010 regarding U.S. Appl. No. 12/411,004, 12 pgs, U.S. Patent and Trademark Office.

* cited by examiner

SYSTEM AND METHOD FOR CUTTING ROOFING SHINGLES

CROSS-REFERENCE TO RELATED APPLICATIONS

This is a continuation-in-part application of pending U.S. application Ser. No. 10/613,152 filed Jul. 3, 2003.

BACKGROUND

This invention relates to a system and method for cutting individual objects, such as shingles, from a continuous sheet of material.

In the mass production of composition, or asphalt, roofing shingles, a cutting cylinder is often positioned to engage a continuous sheet of a composition material that forms the shingles. Cutting blades are provided on the outer circumference of the cutting cylinder and the continuous sheet of material is passed under the cylinder as it is rotated to cut the shingles. In order to produce an attractive pattern, shingles have been cut in a "dragon tooth" pattern. However, when dragon tooth patterns are cut, a lack of variance in shingle patterns result in a non-random appearance when the shingles are applied to a roof, resulting in a relatively unsightly patterned appearance when compared to individual wood shingles, and the like.

Therefore a system and method is needed to produce roofing shingles of the above type which are cut in a dragon tooth pattern yet increase product appearance when compared to the techniques discussed above.

DETAILED DESCRIPTION

Figure 1:
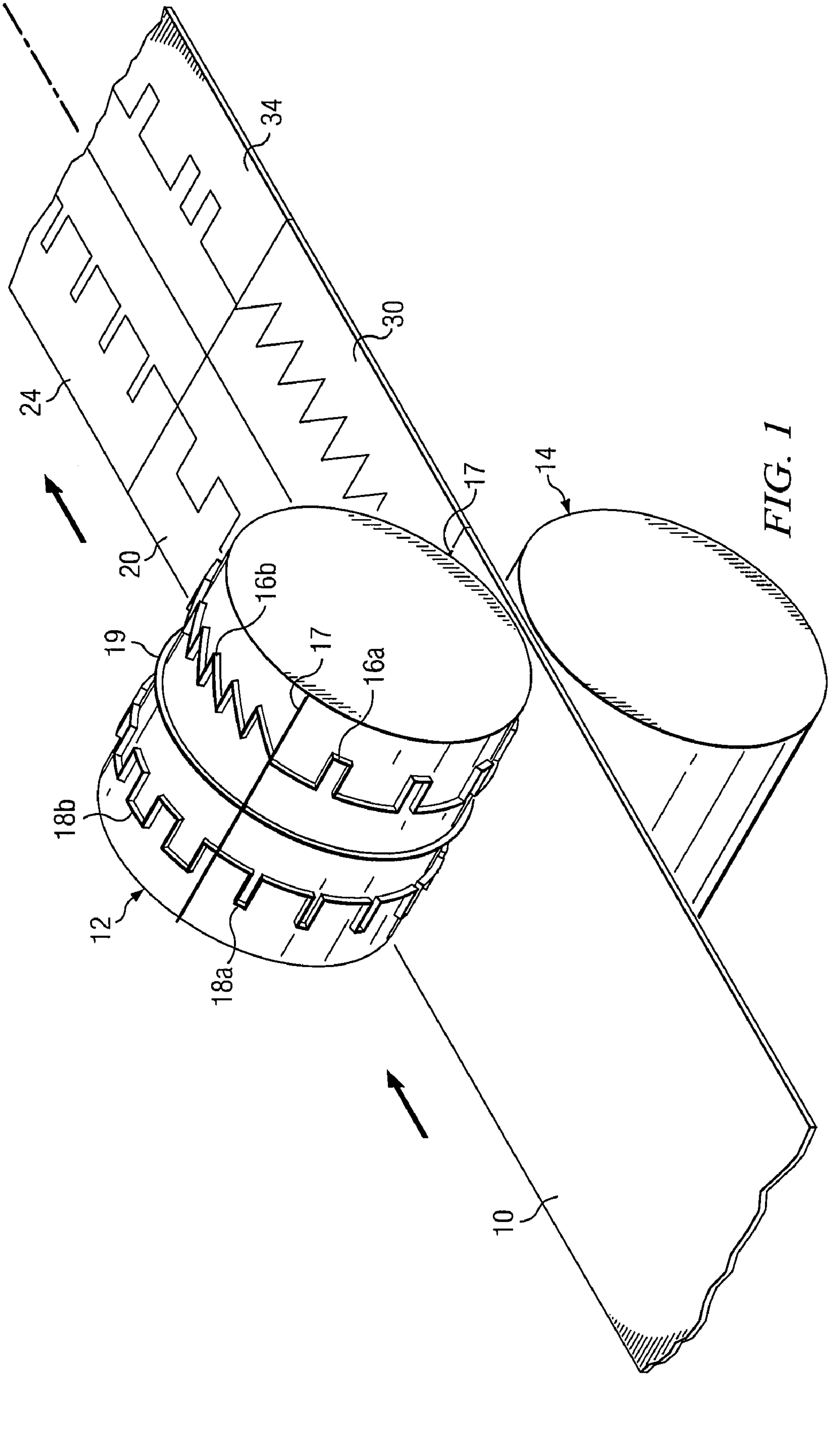
FIG. 1 is an isometric view depicting an embodiment of the system of the present invention.

Referring to FIG. 1, the reference numeral 10 refers to a strip or sheet of material that is used to produce shingles in accordance with an embodiment of the invention. It is understood that the sheet 10 forms a portion of a continuous sheet which is described in detail later. The sheet 10 passes between two opposed cylinders 12 and 14 which are mounted for rotation in a conventional manner. One or both of the cylinders 12 or 14 is driven in any conventional manner to rotate the cylinders and drive the sheet 10 in a longitudinal direction indicated by the arrows while being guided by edge guides, or the like (not shown), all in a conventional manner.

A cutting blade 16*a* is mounted on the outer circumference of the cylinder 12 and is adapted to cut the sheet 10 when it passes between the cylinders 12 and 14. The cutting blade 16*a* extends for approximately one half the circumference of the cylinder, and a cutting blade 16*b* is also mounted on the outer circumference of the cylinder and extends from the cutting blade 16*a* around the remaining one half of the circumference of the cylinder.

A cutting blade 18*a* is also mounted on the outer circumference of the cylinder 12 and extends in a spaced parallel relationship to the blades 16*a* and 16*b* for approximately one half the circumference of the cylinder 12. A cutting blade 18*b* is also mounted on the outer circumference of the cylinder 12 and extends from the cutting blade 18*a* and around the remaining one half of the circumference of the cylinder. A cutting blade 19 is also mounted on the outer circumference of the center portion of the cylinder 12 and extends around the entire circumference of the cylinder. Each cutting blade 16*a*, 16*b*, 18*a*, and 18*b* has a configuration that is different from the other blades and each blade extends for approximately one-half the circumference of the cylinder 12, or 180 degrees. The blades 16*a* and 16*b* are disposed in an end-to-end relationship so that they continuously cut the sheet 10 when it passes between the rotating cylinders 12 and 14. Likewise, the blades 18*a* and 18*b* are disposed in an end-to-end relationship so that they continuously cut the sheet 10 when it passes between the rotating cylinders 52 and 54. The cutting blades 16*a*, 16*b*, 18*a*, 18*b* and 19 are mounted on the cylinder 12 in any conventional manner.

The cutting blades 16*a*, 16*b*, 18*a* and 18*b* are configured to cut four different dragon tooth patterns in the sheet 10 upon one rotation of the cylinder 12. Each dragon tooth pattern produces two shingles with complementary tabs and spaces between the tabs, which will be described. Therefore one rotation of the cylinder 12 produces eight unique shingles.

During the cutting of the above patterns by the blades 16*a*, 16*b*, 18*a* and 18*b*, the center cutting blade 19 cuts the sheet 10 longitudinally to separate the patterns cut by the blades 16*a* and 16*b* from the patterns cut by the blades 18*a* and 18*b*. It is understood that an end cutter (not shown) can be provided downstream from, and in a spaced relation to, the cylinder 12 for making transverse cuts in the sheet to cut the sheets into predetermined lengths.

Figure 2:
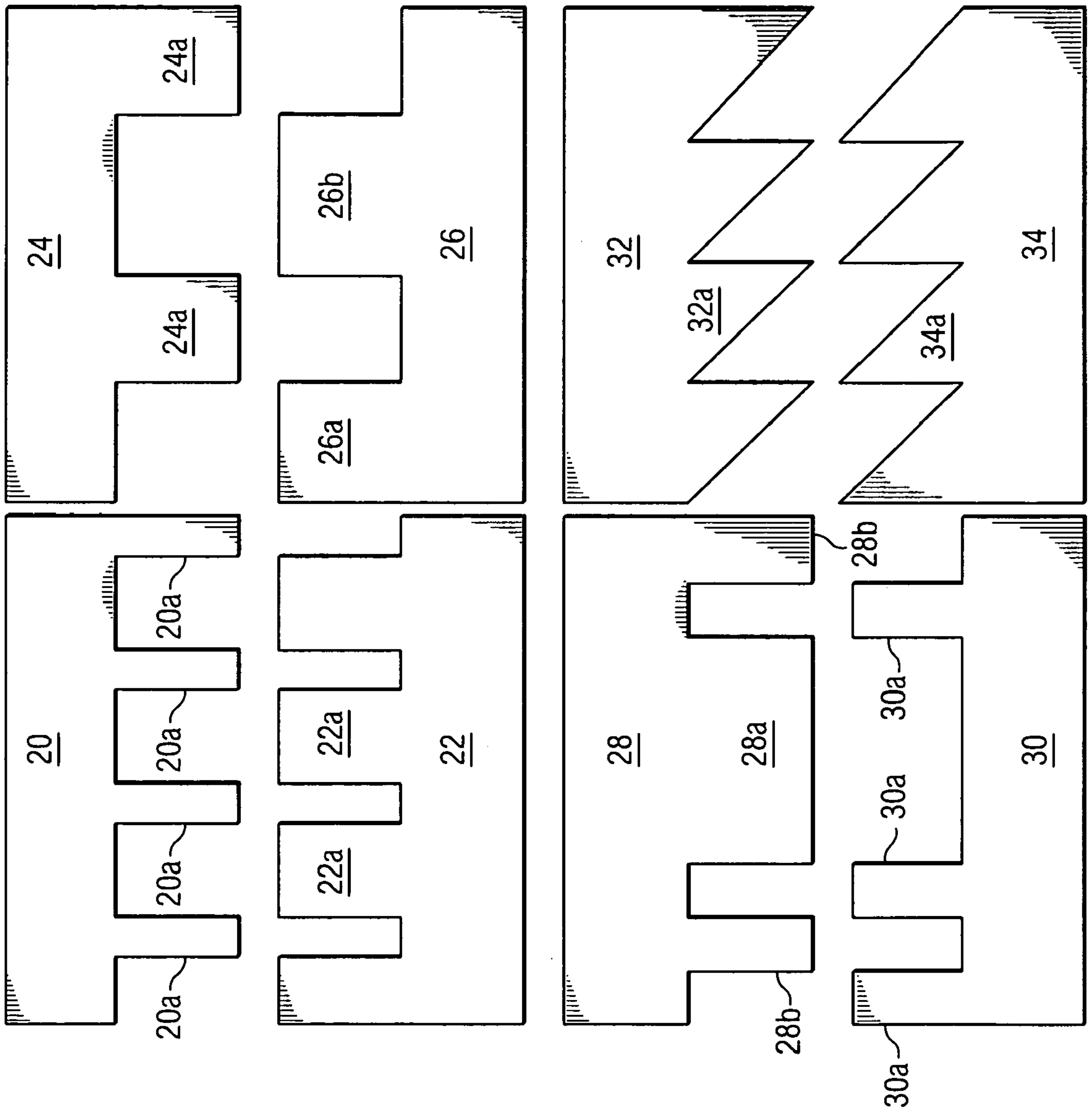
FIG. 2 is an elevational view of eight shingles produced by the system of FIG. 1.

FIG. 2 shows examples of eight different shingles after being cut by the blades 16*a*, 16*b*, 18*a*, 18*b* and 19, and by the above end cutter in response to one rotation of the cylinder 12, with the shingles being shown spaced apart in the lateral and longitudinal directions. In particular, two shingles 20 and 22 are formed by the dragon tooth cut made by the blade 16*a*. The shingle 20 includes four relatively narrow rectangular tabs 20*a*, and the shingle 22 includes four relatively wide rectangular tabs 22*a*.

Two shingles 24 and 26 are formed by the dragon tooth cut made by the blade 16*b*. The dragon tooth pattern cut by the blade 16*b* is such that the shingle 24 includes two relatively wide rectangular tabs 24*a* which are wider than the wide tabs 22*a* of the shingle 22; while the shingle 26 includes a tab 26*a* that is wider than the tabs 24*a* and a tab 26*b* that is wider than the tab 26*a*.

Similarly, two shingles 28 and 30 are formed by the dragon tooth cut made by the blade 18*a*. The latter pattern is such that the shingle 28 includes a relatively wide rectangular tab 28*a* extending between two relatively narrow tabs 28*b*; while the shingle 30 is formed with three rectangular tabs 30*a* of the same width as the tabs 28*b*, with two of the tabs 30*a* being spaced apart as a result of cutting the tab 28*a*.

Two shingles 32 and 34 are formed by the dragon tooth cut made by the blade 18*b*. The dragon tooth pattern cut by the blade 18*b* is such that both shingles 32 and 34 include four triangularly shaped tabs 32*a* and 34*a*.

As a result of the above, one rotation of the cylinder 12 produces eight different shingles 20, 22, 24, 26, 28, 30, 32, and 34 all of which vary in appearance. Thus, when stacked and applied to a roof in sequence, a random, dimensional appearance is achieved rather than the unsightly patterned appearance of the prior art.

In FIGS. 3A-3D, the reference numeral 50 refers to a sheet of material that is used to produce shingles in accordance with another embodiment of the invention. It is understood that the sheet 50 forms a portion of a continuous sheet that passes between two opposed cylinders 52 and 54 which are mounted for rotation in a conventional manner. One or both of the cylinders 52 or 54 is driven in any conventional manner to rotate the cylinders and drive the sheet 50 in a longitudinal direction indicated by the arrows while being guided by edge guides, or the like (not shown), all in a conventional manner.

Four circumferentially-spaced cutting blades 56*a*-56*d* are mounted on the outer circumference of the cylinder 52 in any conventional manner. Each blade 56*a*-56*d* has a configuration that is different from the other blades, and each blade extends for approximately one-fourth the circumference of the cylinder, or for ninety degrees. The blades 56*a*-56*d* are disposed in an end-to-end relationship so that they, when taken together, extend around the entire circumference of the cylinder. Thus, when the sheet passes between the rotating cylinders 52 and 54, the blades 56*a*-56*d* sequentially engage and cut the sheet 50 to make a continuous longitudinal cut down the sheet to separate the sheet into two portions.

Figure 3B:
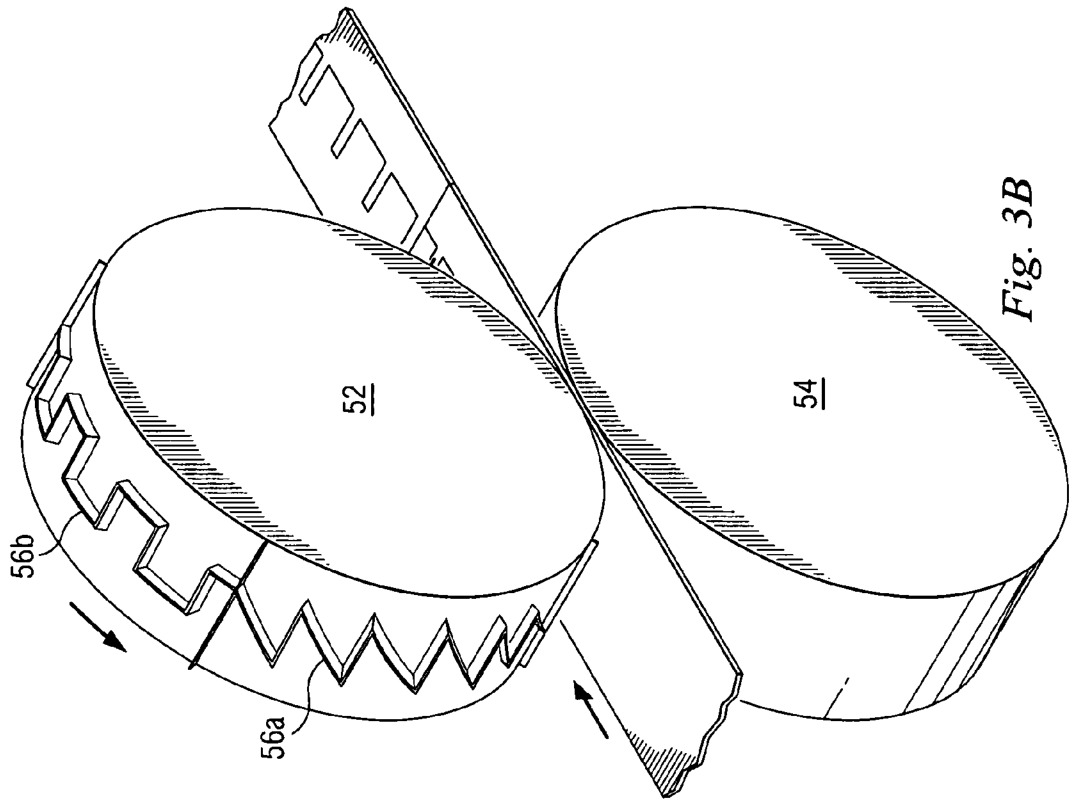
FIGS. 3A-3*d* are views similar to that of FIG. 1 but depicting an alternate embodiment.
Figure 3A:
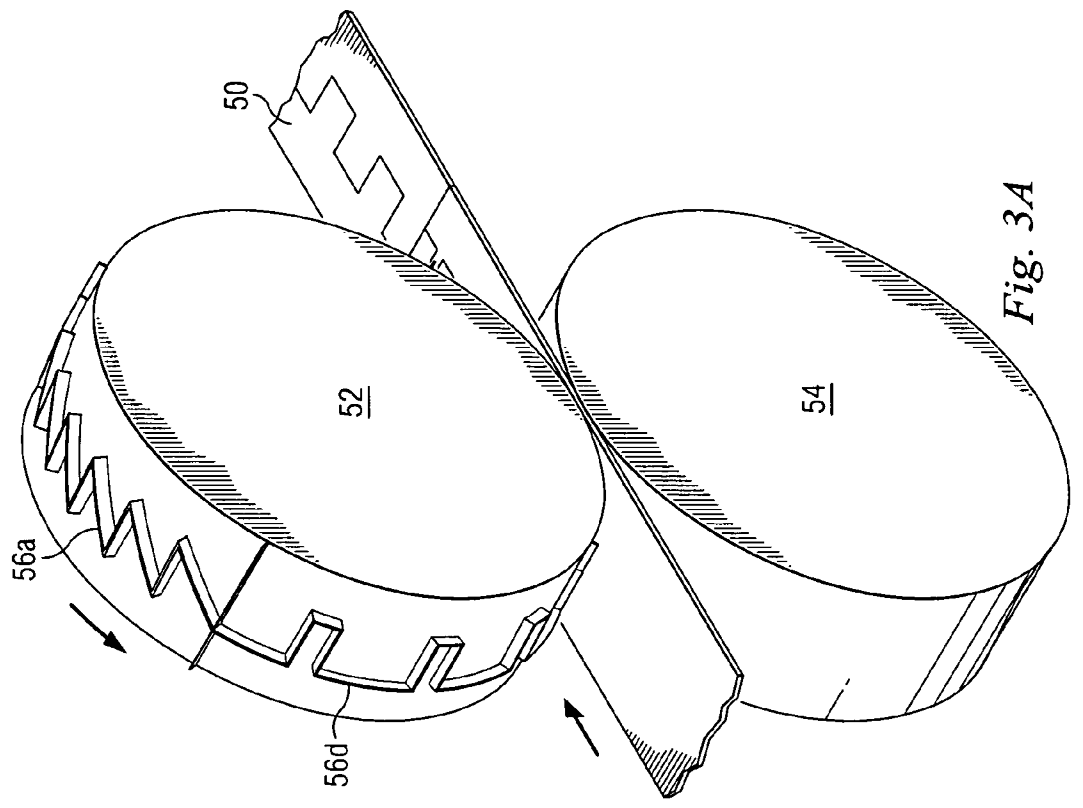
Figure 3D:
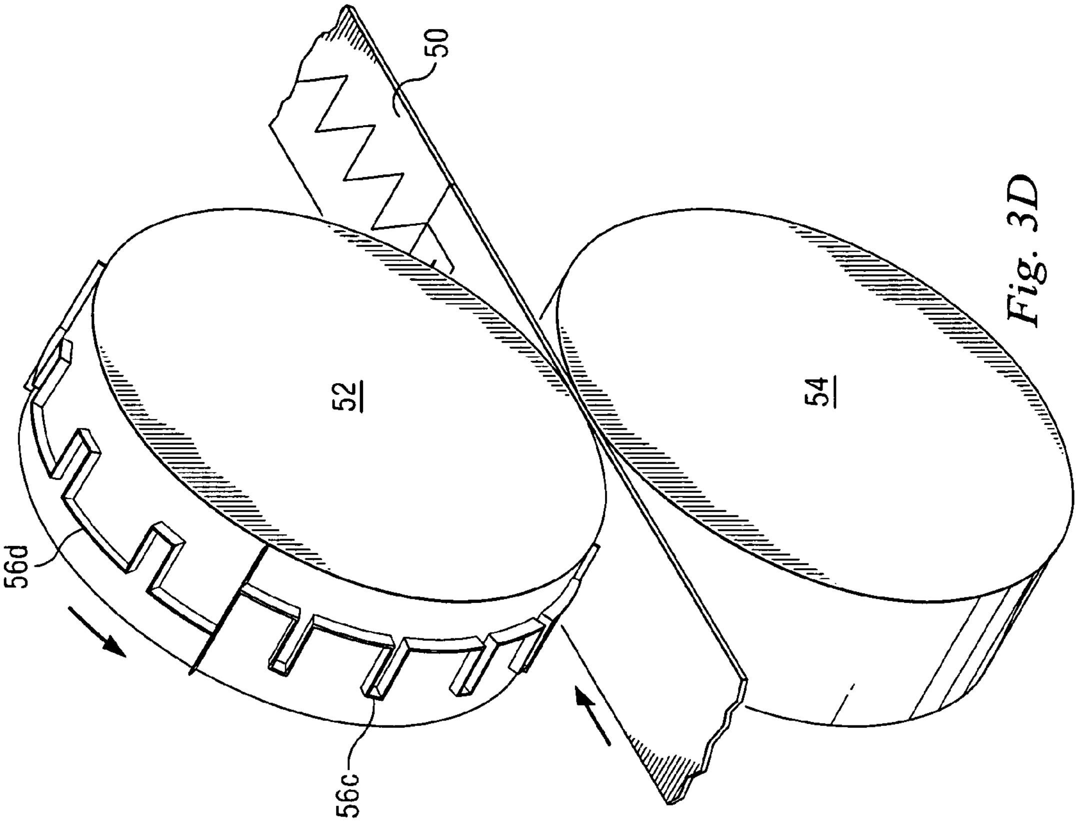
Figure 3C:
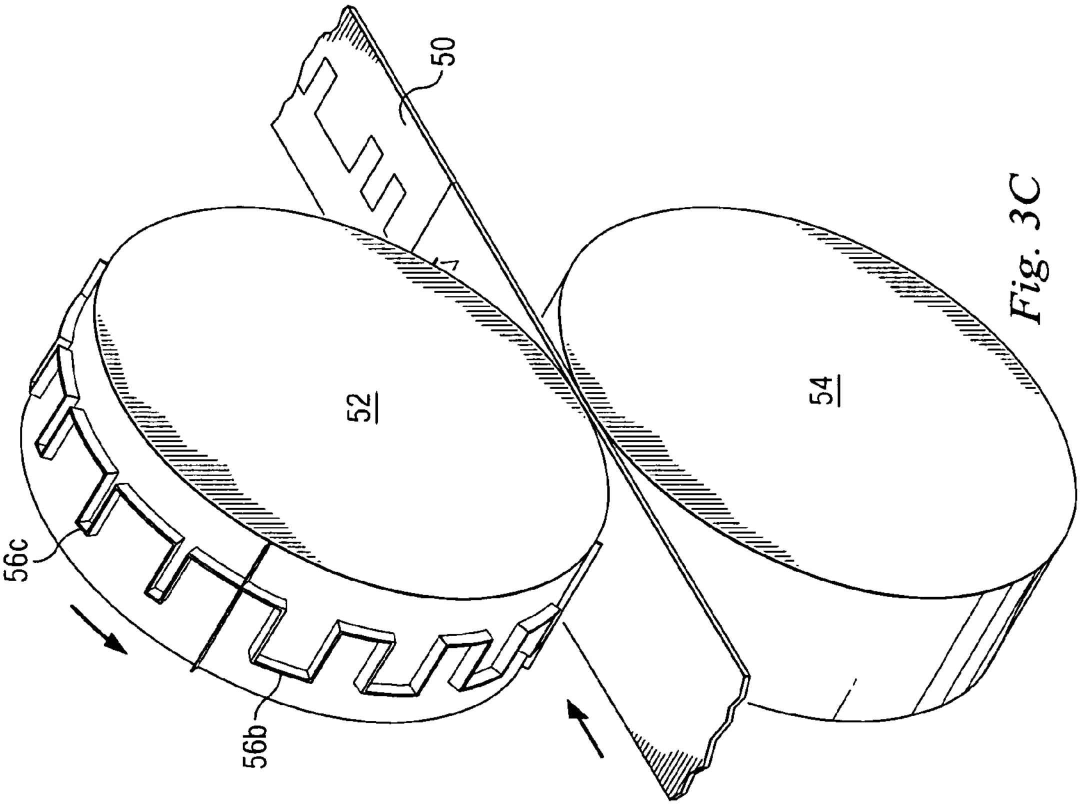

FIG. 3B depicts the cylinder 52 rotated approximately ninety degrees from its position in FIG. 3A; FIG. 3C depicts the cylinder rotated approximately ninety degrees from its position in FIG. 3B; and FIG. 3D depicts the cylinder rotated approximately ninety degree from its position in FIG. 3C. During this rotation, the cutting blades 56*a*-56*d* sequentially engage the sheet and cut the sheet 50 along a cutting line between the two side edges of the sheet and generally towards the center. Thus, upon one rotation of the cylinder 52, each blade 56*a*-56*d* cuts its one quarter portion of the sheet into two shingles extending to either side of the cut line. Since there are four cutting blades 52*a*-52*d*, one rotation of the cylinder 52 produces eight unique shingles.

It is understood that an end cutter (not shown) can be provided downstream from, and in a spaced relation to, the cylinder 52 for making transverse cuts in the sheet to cut the sheets into predetermined lengths.

Figure 4:
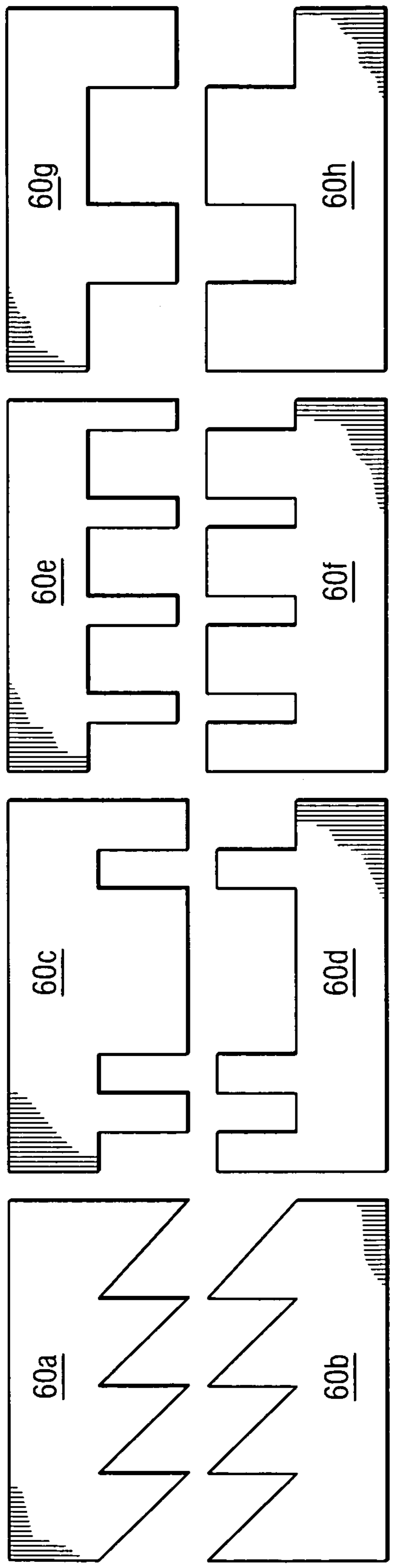
FIG. 4 is an elevational view of eight shingles produced by the system of FIGS. 3A-3D.

FIG. 4 shows examples of eight different shingles 60*a*-60*h* after being cut by the blades 56*a*-56*d* and after they have been paced apart slightly in the lateral and longitudinal directions. Since the shingles 60*a*-60*h* are cut into the same patterns as discussed above in connection with the shingles 20, 22, 24, 26, 28, 30, 32, and 34, they will not be described in detail.

As a result of the above, one rotation of the cylinder 52 produces eight different shingles 60*a*-60*h* all of which vary in appearance. Thus, when stacked and applied to a roof in sequence, a random, dimensional appearance is achieved rather than the unsightly patterned appearance of the prior art mentioned above. It is understood that the method of applying the different patterned shingles 20, 22, 24, 26, 28, 30, 32, and 34 to a supporting structure to form a roof, as discussed above, is equally applicable to the shingles 60*a*-60*h*.

In each of the above embodiments the sheets 10 and 50 may be formed in a conventional manner, such as by applying one or two asphalt coatings to a base material made from a mat of organic felt, fiberglass, polyester, or a blended fiberglass/polyester, and applying one or two outer layers of mineral granules to the asphalt coating(s). Further details of the composition of the sheet 10 and the lamination technique are disclosed in U.S. Pat. No. 5,369,929 which is assigned to the assignee of the present invention and which is incorporated by reference. It is also understood that one or more backing sheets (not shown) can be laminated to the sheets 10 and 50 before the resulting laminated sheets are cut in the foregoing manner. The backing sheet may be identical to the sheets 10 and 50 or may be different from the latter sheets.

Variations

1. The above configurations and patterns of the cutting blades and the shingles are for the purpose of example only, and therefore can vary considerably from those that are shown in the drawings and described above.

2. The sizes and numbers of the cutting blades and the shingles as well as their width, length, and/or shape can vary from the examples shown in the drawings and described above.

3. The end cutter mentioned above can be provided on the cylinders rather than downstream from the cylinders, as indicated by cutters 17 in FIG. 1.

4. One or both of the cylinders can be rotated in manners other than those described in the above embodiments.

5. The configurations of all the blades in each embodiment do not necessarily have to be different as long as at least a portion the blades are different.

6. The above-described relative movement between the cylinders and the sheets can be achieved in other manners.

7. The spatial references, such as "over," "under," "longitudinal," "lateral," and the like, are for the purpose of illustration only and do not limit the specific orientation or location of the structure described above.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

What is claimed is:

1. A system for cutting shingles from a continuous sheet of material, the system comprising:

a cylinder having a circumference;

a first cutting blade mounted on the cylinder and extending halfway along the circumference of the cylinder, the first cutting blade being configured to cut a first dragon tooth pattern in the sheet;

a second cutting blade mounted on the cylinder and extending halfway along the circumference of the cylinder, the first and second cutting blades being disposed in an end-to-end relationship so that together the first and second cutting blades extend along the entire circumference of the cylinder, the second cutting blade being configured to cut a second dragon tooth pattern in the sheet, the second dragon tooth pattern being different than the first dragon tooth pattern;

a third cutting blade mounted on the cylinder and extending halfway along the circumference of the cylinder, the third cutting blade extending in a spaced parallel relationship to the first cutting blade for one half the circumference of the cylinder, the third cutting blade being configured to cut a third dragon tooth pattern in the sheet, the third dragon tooth pattern being different than each of the first and second dragon tooth patterns;

a fourth cutting blade mounted on the cylinder and extending halfway along the circumference of the cylinder, the fourth cutting blade extending in a spaced parallel relationship to the second cutting blade for one half the circumference of the cylinder, the third and fourth cutting blades being disposed in an end-to-end relationship so that together the third and fourth cutting blades extend along the entire circumference of the cylinder, the fourth cutting blade being configured to cut a fourth dragon tooth pattern in the sheet, the fourth dragon tooth pattern being different than each of the first, second and third dragon tooth patterns;

a fifth cutting blade mounted on the center portion of the cylinder and extending along the entire circumference of the cylinder so that the fifth cutting blade is disposed between the first and third cutting blades, and is further disposed between the second and fourth cutting blades;

means for rotating the cylinder while effecting relative translational movement between the cylinder and the sheet; and means, provided on the cylinder, for making transverse cuts in the sheet to thereby cut the sheet into segments, each segment having a length equal to one half the circumference of the cylinder;

wherein, in response to a first revolution of the cylinder during the rotation of the cylinder, the relative translational movement between the cylinder and the sheet, and at least two transverse cuts in the sheet, the fifth cutting blade makes a first longitudinal cut down the center of the sheet to divide a first length of the sheet into two portions, the first length being equal to the entire circumference of the cylinder, and each of the first, second, third and fourth dragon tooth patterns produces two shingles with complementary tabs and spaces between the tabs, thereby producing a first set of eight shingles, each shingle in the first set of eight singles being unique from the other shingles in the first set of eight shingles, wherein, when the shingles in the first set of eight shingles are stacked and applied to a roof in sequence, a random appearance is achieved; and wherein, in response to a second revolution of the cylinder during the rotation of the cylinder, the relative translational movement between the cylinder and the sheet, and two other transverse cuts in the sheet, the fifth cutting blade makes a second longitudinal cut down the center of the sheet to divide a second length of the sheet into two portions, the second length being equal to the entire circumference of the cylinder, and each of the first, second, third and fourth dragon tooth patterns produces two more shingles with complementary tabs and spaces between the tabs, thereby producing a second set of eight shingles, each shingle in the second set of eight singles being unique from the other shingles in the second set of eight shingles, each shingle in the second set of eight singles being substantially identical to one shingle in the first set of eight shingles, wherein, when the shingles in the second set of eight shingles are stacked and applied to a roof in sequence, a random appearance is achieved.

* * * * *